United States Patent [19]
Burnett

[11] 3,811,502
[45] May 21, 1974

[54] SECONDARY RECOVERY USING CARBON DIOXIDE

[75] Inventor: David B. Burnett, Houston, Tex.

[73] Assignee: Texaco Inc., New York, N.Y.

[22] Filed: July 27, 1972

[21] Appl. No.: 275,588

[52] U.S. Cl.................................. 166/252, 166/273
[51] Int. Cl............................................ E21b 43/22
[58] Field of Search...................... 166/252, 273–275

[56] References Cited
UNITED STATES PATENTS

| | | | |
|---|---|---|---|
| 2,623,596 | 12/1952 | Whorton et al.................... | 166/274 |
| 3,084,743 | 4/1963 | West et al........................... | 166/273 |
| 3,256,933 | 6/1966 | Murphree et al.................. | 166/273 |
| 3,623,552 | 11/1971 | Vairogs............................... | 166/274 |
| 3,262,498 | 7/1966 | Connally, Jr. et al. ............. | 166/273 |
| 3,687,198 | 8/1972 | Hearn et al........................ | 166/274 |
| 3,620,304 | 11/1971 | Hearn et al........................ | 166/274 |
| 3,661,208 | 5/1972 | Scott et al........................... | 166/274 |
| 3,249,157 | 5/1966 | Brigham et al. .................... | 166/273 |
| 2,875,830 | 3/1959 | Martin............................... | 166/273 X |

*Primary Examiner*—Stephen J. Novosad
*Attorney, Agent, or Firm*—T. H. Whaley; C. G. Reis

[57] ABSTRACT

Recovery of oil from an oil-bearing reservoir is effected by the injection of carbon dioxide into the reservoir at a pressure whereby there is formed a miscible transition zone between the carbon dioxide and the reservoir fluid.

9 Claims, 2 Drawing Figures

PATENTED MAY 21 1974 3,811,502

SECONDARY RECOVERY USING CARBON DIOXIDE

FIELD OF THE INVENTION

This invention relates to a process for the recovery of oil from an underground reservoir containing oil, by injecting thereinto a slug of carbon dioxide at a predetermined pressure, at which pressure there is formed a miscible transition zone with the reservoir oil, and thereafter injecting a driving agent to move the slug of carbon dioxide and the reservoir oil thru the reservoir to a production well.

DESCRIPTION OF THE ART

In the recovery of oil from an underground reservoir one method that has been suggested for improving oil recovery is that of miscible flooding wherein a solvent is injected into the reservoir to push and wash out the oil of the reservoir. When solvents are employed which can mix completely with the oil, the term "miscible flooding" is applied to the process.

The process of miscible flooding is extremely effective in stripping and displacing the reservoir oil from the reservoir thru which the solvent flows. This effectiveness is derived from the fact that a two-phase system within the reservoir and between the solvent and the reservoir is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

Miscible recoveries of oil are normally accomplished by displacement techniques whereby a fluid that is miscible with the reservoir oil is injected into a reservoir which serves to displace the oil thru the reservoir and toward a production well from which the oil is produced. Normally, the fluids used are light hydrocarbons and mixtures thereof, such as paraffins in the $C_2$ to $C_6$ range and, in particular, liquid petroleum gas or LPG.

Carbon dioxide, while it has been suggested for a displacing agent, is ordinarily not considered a miscible type agent since the pressure at which it is miscible with most reservoir oils is generally greater than about 5000 psia. Carbon dioxide has been used as an oil recovery agent, wherein recovery is improved by taking advantage of the solubility of carbon dioxide in the oil, causing viscosity reduction and the swelling of the oil and thereby leading to increased recovery. However, these effects have been utilized at pressures much lower than miscibility pressures for carbon dioxide and oil. Despite the fact that carbon dioxide has been used, it has not been without difficulties. Among these there is the inherent loss of carbon dioxide to the reservoir oil, the connate water and to any subsequent drive media that may be used, which loss substantially reduces the effectiveness of the use of carbon dioxide. Some of these difficulties have been overcome by the use of a carbonated waterflood medium. Others have involved the use of hydrocarbon and carbon dioxide in combination. From this latter approach, at pressures greater than 700 psia the advantages relating to the solubility of carbon dioxide and the resultant volume swelling and reduction in viscosity of the oil are realized.

It is an object of the present invention to better utilize carbon dioxide as a recovery agent by means of a conditional miscible flooding process, wherein the carbon dioxide miscibly displaces the reservoir oil. It is a further object of this invention to provide a technique for determining and creating a miscible transition zone between a carbon dioxide slug and oil.

SUMMARY OF THE INVENTION

This invention relates to the recovery of oil from an oil-bearing reservoir wherein a slug of carbon dioxide is injected into the reservoir at a pressure at least at which the carbon dioxide is miscible with the reservoir in an amount sufficient to form a conditional miscible transition zone with the reservoir oil at the reservoir conditions of pressure and temperature, and thereafter injecting a driving agent to displace the reservoir oil toward a production well from which the oil is produced.

DESCRIPTION OF THE INVENTION

In its broadest aspect the invention comprises first introducing into an oil-bearing reservoir a slug of carbon dioxide at an experimentally determined pressure at which the carbon dioxide is miscible with the reservoir fluids, thereby forming a miscible transition zone with the reservoir oil, continuing injection of carbon dioxide to establish a slug of carbon dioxide, and thereafter injecting a driving fluid such as water, natural gas or flue gas to displace the oil thru the reservoir to a production well from which it is produced.

This invention resides in the fact that the reservoir is flooded at a pressure at which the conditional miscibility exists between carbon dioxide and the reservoir oil. Conditional miscibility is to be distinguished from instant miscibility by the fact that miscibility in a conditional miscibility sense is achieved by a series of transition multiphase conditions wherein the injected carbon dioxide vaporizes intermediate components from the oil until it becomes miscible, thus creating the miscible transition zone in situ in the reservoir by a vaporizing gas drive.

According to the invention, there is a minimum pressure at which miscibility can exist between the carbon dioxide and oil. This minimum pressure can be determined by means of slim tube displacement tests which means conditions are established simulating those of an enriched gas drive. An enriched gas drive is a production technique wherein intermediates in the displacing agent or fluid are absorbed into the reservoir oil at a front existing between the fluid and the oil. The absorption continues until a miscible transition zone is formed between the fluid and the oil.

Figure 1:
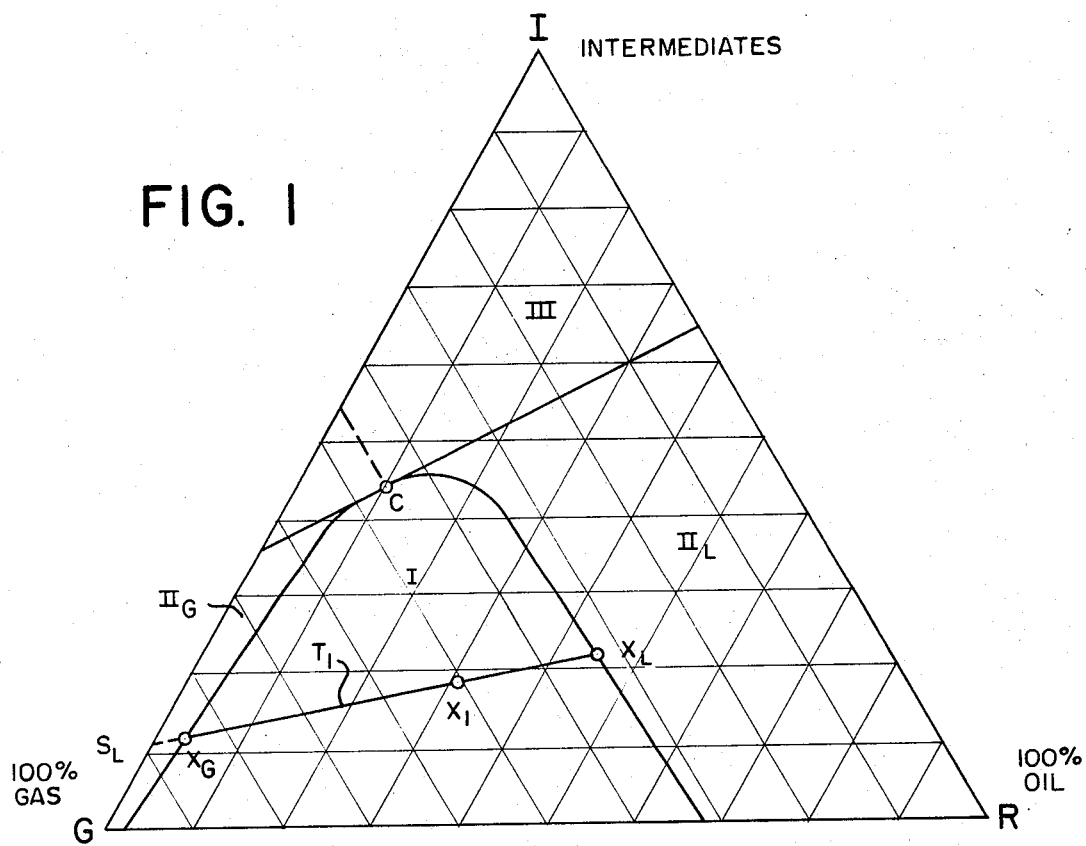
FIG. 1 illustrates a three-component composition diagram for a complex hydrocarbon system.
Figure 2:
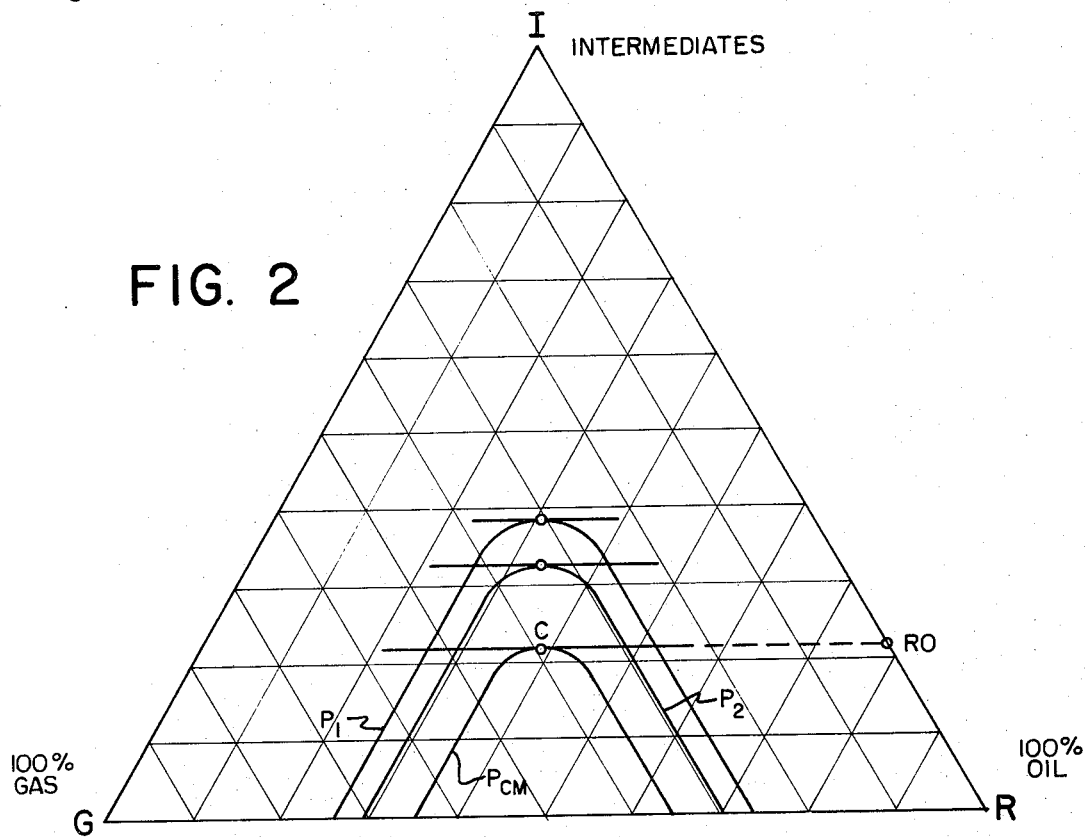
FIG. 2 illustrates a three-component composition diagram with superimposed three two-phase envelopes thereon for different pressures.

A further insight into the invention can be obtained by referring to FIGS. 1 and 2.

A solvent-oil system may be considered on a pseudo three-component system as shown in FIG. 1. The system is divided into four regions bounded by the two-phase boundary curve and by the tangent to the phase boundary curve at the critical point C. Region I is the two-phase sector of the pseudo-ternary diagram. Any fluid (e.g. $X_1$) in Region I exists in a liquid and a gas phase whose liquid and gas compositions are depicted respectively by points $X_L$ and $X_G$. Solvents in region $II_G$ and oils in region $II_L$ lie on extensions of tie lines in the two-phase region. A tie line, such as $T_1$, may be extended thru a solvent $S_L$. If both the solvent and the oil lie on extensions of the lines, a displacement of oil by the solvent would be immiscible. If neither the solvent nor the oil lie on the tie line extension (Region III), the displacement would be miscible on first contact. If either the solvent or the oil lie on tie line extension, then a displacement would classify as one of conditional miscibility.

In FIG. 2 this system for the gas, carbon dioxide, basic intermediates (normally $C_2$–$C_4$) and oil are shown. At a given pressure the phase envelope is smaller than would be predicted for a gas such as methane because of the higher solubility of the carbon dioxide in oil. As the total pressure is increased on a system as described, e.g., one containing carbon dioxide, intermediates and oil, the phase envelope becomes smaller. In applying this to the instant invention when the minimum conditional miscibility pressure is determined, as illustrated by C on FIG. 2, the tangent to the critical, which passes thru the point representing the reservoir oil composition (RO) the system becomes conditionally miscible.

In the method of the invention slim tube tests are performed to determine the minimum miscibility pressure whereby conditional miscibility can occur. By means of the tests, percent recovery of the in-place fluid is determined at solvent breakthru at given pressure conditions. By varying the pressure at constant composition a break-point is determined in a curve of percent recovery versus pressure. This break-point is indicative of the inception of conditional miscible-type behaviour.

In conducting slim tube tests, a 40 foot long tube is filled with sand which is then saturated with the oil of interest. A displacing fluid such as carbon dioxide is then injected at a given rate and thereafter displacement of the oil is then monitored by means of observing the effluent from the tube.

The configuration of the substrate system is such that gravity effects, mixing due to permeability variations, viscous fingering and diffusion effects are minimized so that displacement efficiency is a function of the thermodynamic properties, temperature, pressure and fluid composition.

While the minimum conditional miscibility pressure is dependent upon the properties of the reservoir and the fluid compositions, the pressure range is generally in the range of about 900 psia to 4000 psia.

Observation of the first appearance of a gas phase is noted in a high pressure sight glass, and recovery is then determined at the point in time of this appearance of two phases.

In one series of slim tube tests, these observations may be presented as follows. After 0.94 pore volumes of carbon dioxide had been injected, the effluent of reservoir oil began to lighten in color indicating the incipient formation of a transition zone. After 0.98 pore volume of carbon dioxide had been injected, the color of the effluent had become very light. At 1.01 pore volume, the first appearance of carbon dioxide was noted by two-phase flow in the sight glass. Recovery of oil at 1.0 pore volume of injected carbon dioxide was 0.96 percent. For the tests described the integrity of the slug of carbon dioxide was maintained and the difficulties of dissipation of the slug were minimized. In another series of tests of a given reservoir oil, displacement studies were conducted at different pressures using carbon dioxide as a displacing fluid. The following table presents the results of these tests for a displacement rate of 24 ml/hr.

| Test No. | Pressure (psia) | % Recovery at First Two-Phase Appearance |
|---|---|---|
| 1 | 500 | 33.7 |
| 2 | 1000 | 47.6 |
| 3 | 1500 | 74.2 |
| 4 | 2000 | 89.9 |
| 5 | 2500 | 91.2 |

Miscible transition zones of the type described were noted in tests 4 and 5. In tests 1, 2 and 3 immiscible behaviour was observed which caused oil recovery to be diminished. Therefore, for this system to realize the benefits of a conditionally miscible displacement process with the lowest cost of solvent compression and reservoir repressurization the flood would be performed at 2000 psia.

The discussion relating to the ternary diagrams as set forth hereinabove with respect to the practice of the invention, and as illustrated by the figures and laboratory tests are not limitive of this invention but merely illustrative thereof. Any suitable gas that fulfills the conditions for establishing and maintaining the requisite conditional miscibility condition with the oil may be employed.

After having established a slug of carbon dioxide and the transistion zone between the reservoir oil and the carbon dioxide within the reservoir, a driving fluid is then injected to drive the slug, the transition zone and the reservoir oil thru the reservoir towards the production well from which the oil can be produced. The driving fluid may be any relatively inexpensive fluid, including gas such as air, nitrogen, combustion or flue gas, separator gas, natural gas or mixtures thereof. The drive fluid may also be water or brine and may contain additives such as a surfactant, to maintain efficient displacement of the driving fluid.

The driving agent is injected in amounts sufficient to displace the carbon dioxide slug thru the reservoir and is injected at a rate so that the preferred rate of movement thru the reservoir is from about 0.03 to about 10.0 feet per day.

It is within the scope of the invention to apply the process either as a horizontal displacement technique wherein the slug of the carbon dioxide is established to form a circumferential ring expanding from the injection well as the process is continued, or it can be used in a vertical displacement wherein a blanket of the carbon dioxide is established prior to the injection of the driving fluid and which moves the blanket vertically thru the reservoir.

In summary, in accordance with the practice of this invention, a conditional miscible flood is carried out in the following manner. There is introduced into the reservoir a slug of carbon dioxide that is capable of forming with the reservoir oil, at the temperature and pressure thereof, a zone of conditional miscibility. After an amount sufficient to establish a slug of the carbon dioxide has been injected, there is introduced into the formation a driving fluid such as a gas or water. The injection of the driving fluid is continued so as to move the fluids of the reservoir thru the reservoir toward a production well from which the reservoir oil and the solvent can be produced. By operating in the above-indicated manner a substantially complete displacement of the reservoir oil is realized.

I claim:

1. A process for recovering oil from an oil-bearing reservoir traversed by at least one injection well and one production well comprising the steps of:
   a. determining the minimum conditional miscibility pressure at the temperature of said reservoir at which carbon dioxide forms a miscible transition zone with said oil;
   b. injecting a fluid into said reservoir to repressure said reservoir to a pressure at least that at which conditional miscibility exists at the temperature of said reservoir between said carbon dioxide and said oil;
   c. injecting into said reservoir via said injection well a slug of carbon dioxide at said pressure of step (b) in amounts sufficient to establish a transition zone of said slug with said reservoir oil;
   d. injecting a driving fluid into said reservoir and driving said oil thru said reservoir towards said production well;
   e. producing said oil via said production well.

2. The process of claim 1 wherein said repressuring fluid is selected from the group consisting of air, nitrogen, combustion gas, natural gas, methane, water and mixtures thereof.

3. The process of claim 1 wherein said minimum pressure of said formation is in the range of about 900 to about 4000 psia.

4. The process of claim 1 wherein said driving fluid is selected from the group consisting of air, nitrogen, combustion gas, separator gas, natural gas, methane, water and mixtures thereof.

5. A process for the recovery of oil from an oil-bearing reservoir traversed by at least one injection well and one production well comprising the steps of:
   a. injecting into said reservoir via said injection well carbon dioxide at a pressure at which carbon dioxide forms a conditionally miscible transition zone with said oil at the temperature of said reservoir, said carbon dioxide being injected in amounts sufficient to establish said transition zone;
   b. thereafter injecting into said reservoir via said injection well a driving fluid and driving said oil thru said reservoir towards said production well;
   c. producing said oil via said production well.

6. The process of claim 5 wherein step (a) is preceded by injection of a fluid to increase the pressure of said reservoir to the minimum conditional miscibility pressure at which carbon dioxide is miscible with said oil.

7. The process of claim 6 wherein said repressuring fluid is selected from the group consisting of air, nitrogen, combustion gas, natural gas, methane, water and mixtures thereof.

8. The process of claim 5 wherein said minimum pressure is in the range of about 900 to about 4000 psia.

9. The process of claim 5 wherein said driving fluid is selected from the group consisting of air, nitrogen, separator gas, combustion gas, natural gas, water and mixtures thereof.

* * * * *